US009469218B2

(12) United States Patent
Girouard et al.

(10) Patent No.: US 9,469,218 B2
(45) Date of Patent: Oct. 18, 2016

(54) SEAT FOR A VEHICLE

(71) Applicant: BOMBARDIER RECREATIONAL PRODUCTS INC., Valcourt (CA)

(72) Inventors: Bruno Girouard, Shefford (CA); Vincent Tognon, Racine (CA); Benoit Marleau, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/907,953

(22) PCT Filed: Jul. 24, 2014

(86) PCT No.: PCT/IB2014/063386
§ 371 (c)(1),
(2) Date: Jan. 27, 2016

(87) PCT Pub. No.: WO2015/015381
PCT Pub. Date: Feb. 5, 2015

(65) Prior Publication Data
US 2016/0176317 A1 Jun. 23, 2016

Related U.S. Application Data

(60) Provisional application No. 61/860,649, filed on Jul. 31, 2013.

(51) Int. Cl.
*B62M 27/02* (2006.01)
*B60N 2/10* (2006.01)

(52) U.S. Cl.
CPC ............... *B60N 2/10* (2013.01); *B62M 27/02* (2013.01); *B62M 2027/028* (2013.01)

(58) Field of Classification Search
CPC ................. B62M 27/02; B62M 2027/028
See application file for complete search history.

(56) References Cited

U.S. PATENT DOCUMENTS 2,284,352 A 5/1942 Zank
2,489,981 A 11/1949 Rose
(Continued)

FOREIGN PATENT DOCUMENTS

DE 10252204 B3 2/2004

OTHER PUBLICATIONS

International Search Report of PCT/IB2014/063386; Oct. 28, 2014; Lee W. Young.
(Continued)

*Primary Examiner* — Anne Marie Boehler
*Assistant Examiner* — Gabriela C Craciun
(74) *Attorney, Agent, or Firm* — BCF LLP

(57) ABSTRACT

A vehicle has a body. A pivotable seat has a front portion pivotally connected to the body about a front pivot point and extending rearwardly therefrom to a back portion. A rear left leg is pivotally connected to the body about a left lower pivot point and to the back portion to about a left upper pivot point. A rear right leg is pivotally connected to the body about a right lower pivot point and to the back portion about a right upper pivot point. A distance between the lower pivot points is greater than a distance between the upper pivot points. The seat is pivotable relative to the body about an instantaneous seat pivot axis passing through the front pivot point, a left axis extending through the left upper and lower pivot points, and a right axis extending through the right upper and lower pivot points.

20 Claims, 15 Drawing Sheets

(56) References Cited

U.S. PATENT DOCUMENTS 2,707,986 A    5/1955   Johnson
3,736,020 A    5/1973   Pilachowski et al.
5,765,803 A    6/1998   Graham
7,694,768 B2    4/2010   Giese et al.

OTHER PUBLICATIONS

English abstract of DE10252204; retrieved from http://worldwide.espacenet.com/ on Jan. 21, 2016.

SEAT FOR A VEHICLE

CROSS-REFERENCE

The present application claims priority to U.S. Provisional Patent Application No. 61/860,649 filed on Jul. 31, 2013, the entirety of which is incorporated herein by reference.

FIELD OF THE TECHNOLOGY

The present technology relates generally to vehicle seats, specifically to straddle-type vehicle seats.

BACKGROUND

Straddle seats are provided on many different kinds of vehicles, such as motorcycles, snowmobiles and three-wheeled vehicles. Vehicles having straddle seats are used for sport, recreation, and utility purposes. The vehicles may also be used for touring purposes where the driver and one or more passengers remain seated on the vehicle for long periods of time. Straddle-seat vehicles may be operated on different kinds of terrains.

When effecting a turn on a steer-in-direction vehicle such as a snowmobile or an ATV that does not lean (unlike a motorcycle that leans while turning), the driver senses a centrifugal force due to the lateral acceleration of the vehicle. The centrifugal force sensed by the driver is in the direction opposite to the direction in which the vehicle is turning. The driver therefore leans to the inside of the turn to counteract this centrifugal force and to remain on the vehicle. Sometimes, the driver even displaces their hips to the side portion of the seat. Leaning or moving to the inside of the turn counteract the centrifugal force can cause certain be inconveniences. Straddle seats are generally narrower than the driver's body and have a rounded shape with the side portion being generally less cushioned than the central portion of the seat. The less cushioned side portion of the seat thus provides reduced impact absorption to the driver compared the to central seat portion, leading to a bumpier ride for the driver. Additionally, as the driver's hips move to the side, the driver's arms operating the handlebar become misaligned with the spine. The force required for the driver to remain on the seat is also greater while making a turn than when traveling straight.

There is thus a need for a vehicle seat that offers comfortable support to the driver and/or other riders during operation of the vehicle on different kinds of terrains, whether the driver is leaning or upright, turning or travelling straight.

SUMMARY

It is an object of the present technology to ameliorate at least some of the inconveniences present in the prior art.

In one aspect, a vehicle has a vehicle body defining a longitudinal axis of the vehicle. A pivotable seat has a seat front portion and a seat back portion, the front portion being pivotally connected to the vehicle body about a front pivot point and extending rearwardly therefrom to the seat back portion. A rear left leg is pivotally connected to the vehicle body to pivot about a left lower longitudinal pivot axis passing through a left lower pivot point. The rear left leg is pivotally connected to the seat back portion to pivot about a left upper longitudinal pivot axis passing through a left upper pivot point. A rear right leg is pivotally connected to the vehicle body to pivot about a right lower longitudinal pivot axis passing through a right lower pivot point. The rear right leg is pivotally connected to the seat back portion to pivot about a right upper longitudinal pivot axis passing through a right upper pivot point. A distance between the left and right lower pivot points being greater than a distance between the left and right upper pivot points. The seat is pivotable relative to the vehicle body about an instantaneous seat pivot axis passing through the front pivot point, a left axis extending through the left upper and lower pivot points, and a right axis extending through the right upper and lower pivot points.

In an additional aspect, the rear left leg and the rear right leg form a four-bar linkage with the front portion of the seat and the vehicle body.

In another aspect, the seat moves in an arc centered about the front pivot point when viewed from above and when viewed from the rear.

In a further aspect, a right stopper limits pivoting of the rear right leg and a left stopper limiting pivoting of the rear left leg.

In a further aspect, when viewed from the rear, the right stopper limits clockwise direction pivoting of the rear right leg and the left stopper limits counterclockwise direction pivoting of the rear left leg.

In another aspect, the seat includes a seat frame and a seat cushion. The seat frame includes a front frame member pivotably connected to the vehicle body about the front pivot point, the seat cushion being connected to the front frame member.

In a further aspect, a damper is connected between one of the seat back portion, the rear left leg and the rear right leg and an other of seat back portion, the rear left leg and the rear right leg.

In an additional aspect, a spring is connected between one of the seat back portion, the rear left leg and the rear right leg and an other of the seat back portion, the rear left leg and the rear right leg. The spring biases the seat to an untilted position where the instantaneous seat pivot axis is aligned with a longitudinal centerplane defined by the vehicle body.

In another aspect, the spring is a tunable spring having an adjustable biasing force.

In an additional aspect, the rear left leg extends forwardly and upwardly from the left lower pivot point, and rearwardly and upwardly to the left upper pivot point. The rear right leg extends forwardly and upwardly from the right lower pivot point, and rearwardly and upwardly to the right upper pivot point.

In an additional aspect, a ball joint pivotably connects the seat front portion to the vehicle body.

In another aspect, the seat front portion extends rearwardly and downwardly from the front pivot point.

In a further aspect, the seat front portion has a front left brace and a front right brace connected together at respective front ends thereof.

In another aspect, a distance between the front right brace and the front left brace increases with distance from the front pivot point.

In another aspect, at least a portion of the front left brace is parallel to a portion of the front right brace.

In an additional aspect, the vehicle is a snowmobile with a longitudinally extending tunnel. The rear left leg and the rear right leg are connected to the tunnel and extend upwardly therefrom.

In another aspect, the snowmobile further has an upper structure rigidly connected to the tunnel. The seat front portion is pivotably connected to the upper structure about the front pivot point. The upper structure has a rear left upper structure brace and a rear right upper structure brace extending forwardly and upwardly from the tunnel. The seat front portion is disposed laterally between the left and right upper structure braces.

In another aspect, a seat assembly is provided for a vehicle having a vehicle body. The seat assembly includes a rear left leg, a rear right leg, and a pivotable seat. The pivotable seat has a front portion and a back portion. The rear left leg is adapted to be pivotally connected to the vehicle body about a left lower pivot point, and adapted to be pivotable about a left lower longitudinal pivot axis passing through the left lower pivot point. The rear left leg is pivotally connected to the seat back portion about a left upper pivot point and pivotable about a left upper longitudinal pivot axis passing through the upper left pivot point. The rear right leg is adapted to be pivotally connected to the vehicle body about a right lower pivot point and adapted to be pivotable about a longitudinal pivot axis passing through the right lower pivot point. The rear right leg is pivotably connected to seat back portion about a right upper pivot point and being pivotable about a longitudinal pivot axis passing through the upper right pivot point. The seat front portion extends forwardly from the seat back portion and adapted to be pivotally connected to the vehicle body about a front pivot point. A distance between the left and right lower pivot points is greater than a distance between the left and right upper pivot points. The seat is pivotable relative to the vehicle body when connected thereto about an instantaneous seat pivot axis passing through the front pivot point, a left axis extending through the left upper and left lower pivot points, and a right axis extending through the right upper and right lower pivot points.

In yet another aspect, a seat cushion is rigidly connected to the seat front portion.

In an additional aspect, a damper connects between one of the seat, the rear left leg and the rear right leg and an other of the seat, the rear left leg and the rear right leg.

In a further aspect, a spring is connected between one of the seat, the rear left leg and the rear right leg and an other of the seat, the rear left leg and the rear right leg. The spring biases the seat to an untilted position where the instantaneous seat pivot axis is aligned with a longitudinal centerplane defined by the vehicle body.

For purposes of the present application, terms related to spatial orientation when referring to a vehicle and components in relation to the vehicle, such as "forwardly", "rearwardly", "left", "right", "above" and "below", are as they would be understood by a driver of the vehicle, with the vehicle in a straight ahead orientation (i.e. not steered left or right), and in an upright position (i.e. not tilted). The definitions provided herein take precedence over the definitions that may be provided in the document incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Although a snowmobile is being described herein, it should be understood that at least some aspects of the present technology could also be applied to other kinds of vehicles having straddle-type seats such as, for example, personal watercraft, all-terrain vehicles (ATVs), motorcycles, three-wheeled motorized vehicles, and the like.

Figure 1:
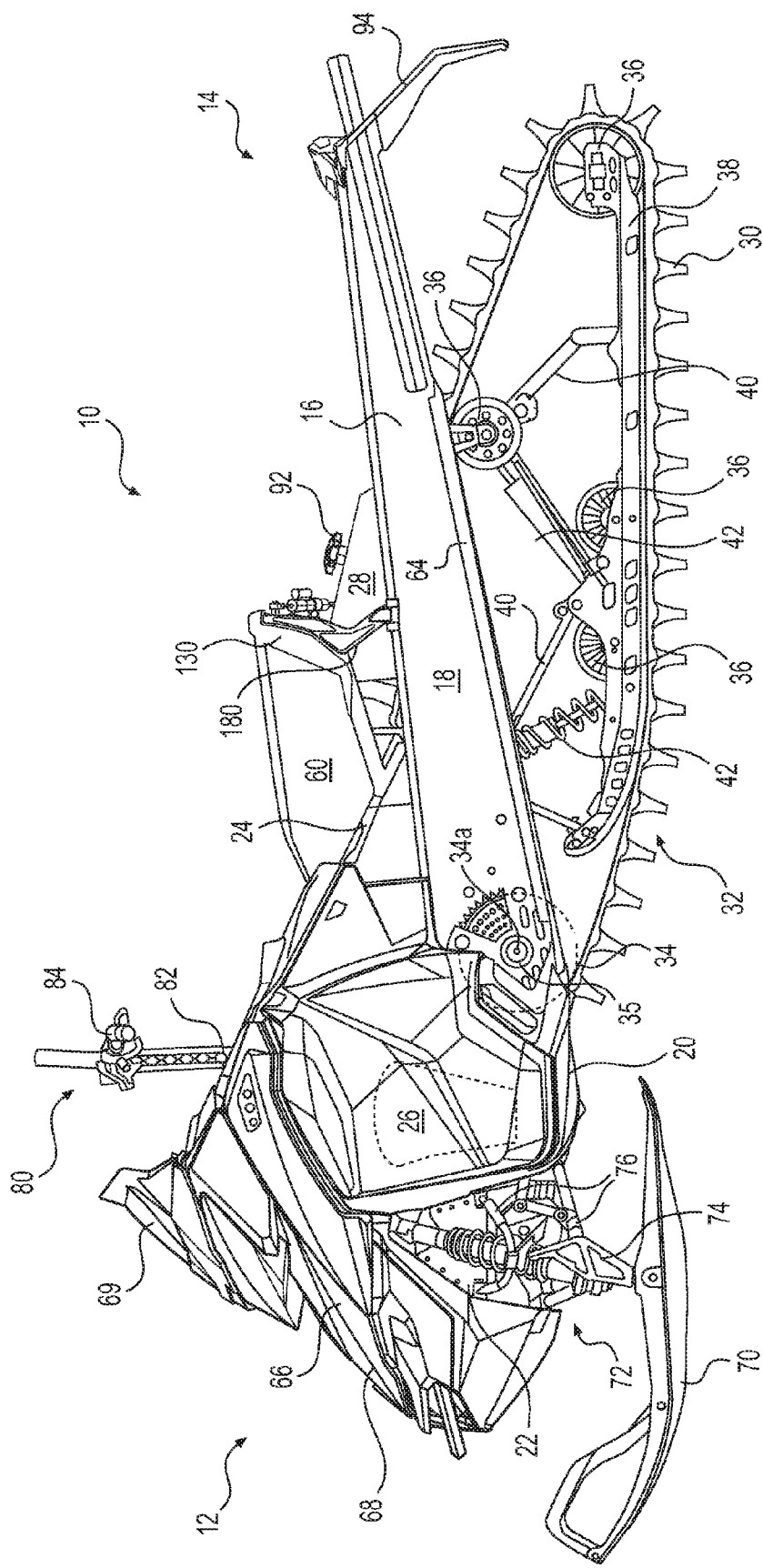
FIG. 1 is left side elevation view of a snowmobile.

Referring to FIG. 1, a snowmobile 10 includes a forward end 12 and a rearward end 14 which are defined consistently with a travel direction of the vehicle 10. The snowmobile 10 includes a vehicle body in the form of a frame or chassis 16 which includes a rear tunnel 18, an engine support structure 20, a front suspension module 22 and an upper structure 24. The tunnel 18 defines a longitudinal centerplane 13 (longitudinally disposed vertical plane, FIG. 4C) of the snowmobile 10. The upper structure 24 includes a rear left brace 25, a rear right brace 25 and a pair of forward braces (not shown) connected together at a steering bracket 120 (FIG. 2) to form a pyramidal structure. Each rear brace 25 extends upwardly, forwardly and laterally inwardly from the tunnel 18. Each forward brace extends rearwardly, upwardly and laterally inwardly from the front suspension module 22.

An engine 26, which is schematically illustrated in FIG. 1, is carried is carried in an engine compartment defined by the engine cradle portion 20 of the frame 16. A fuel tank 28, supported above the tunnel 18, supplies fuel to the engine 26 for its operation.

An endless drive track 30 is positioned at the rear end 14 of the snowmobile 10. The drive track 30 is disposed generally under the tunnel 18, and operatively connected to the engine 26 through a belt transmission system (not shown) and a reduction drive. The endless drive track 30 is driven to run about a rear suspension assembly 32 connected to the frame 16 for propulsion of the snowmobile 10.

The rear suspension assembly 32 includes a drive sprocket 34, one or more idler wheels 36 and a pair of slide rails 38 in sliding contact with the endless drive track 30. The drive sprocket 34 is mounted on a drive axle 35 and defines a sprocket axis 34a. The slide rails 38 are attached to the tunnel 18 by front and rear suspension arms 40 and one or more shock absorbers 42 which include a coil spring (not indicated) surrounding the individual shock absorbers 42.

Figure 2:
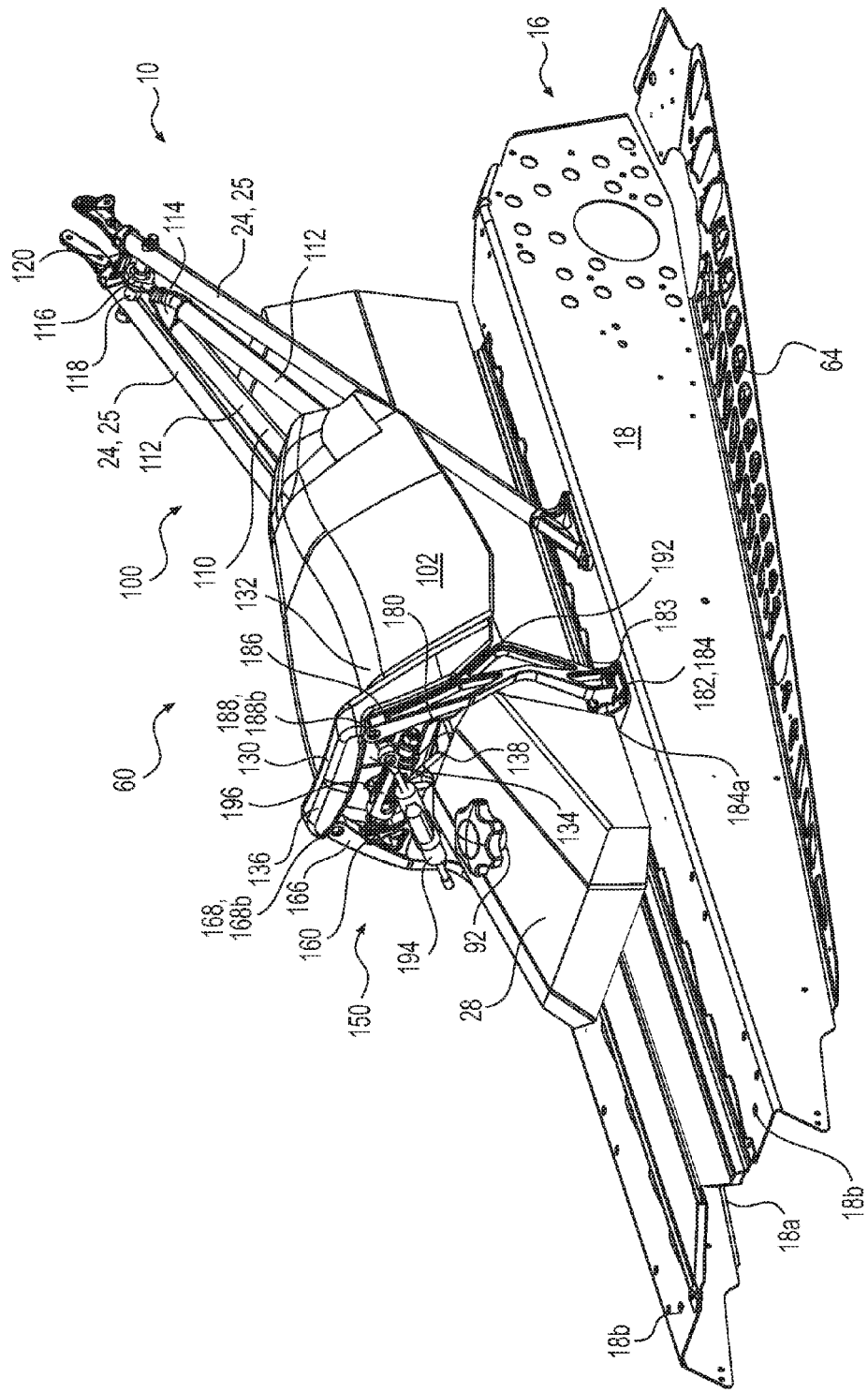
FIG. 2 is a perspective view, taken from a rear, right side, of a portion of the snowmobile of FIG. 1 showing a portion of the snowmobile frame, the fuel tank and the seat.

A straddle-type seat 60 is positioned atop the fuel tank 28. The seat 60 is adapted to accommodate a driver of the snowmobile 10. The seat 60 is a pivoting seat and includes a seat frame 100 (FIG. 2) and a seat cushion 102 (FIG. 2). The seat frame 100 is pivotably connected to the vehicle frame 16 and will be described below in further detail. The seat 60 can be configured to accommodate a passenger. A footrest 64 is positioned on each side of the snowmobile 10 below the seat 60 to accommodate the driver's feet.

At the front end 12 of the snowmobile 10, fairings 66 enclose the engine 26 and the belt transmission system, thereby providing an external shell that not only protects the engine 26 and the transmission system, but can also be decorated to make the snowmobile 10 more aesthetically pleasing. Typically, the fairings 66 include a hood 68 and one or more side panels which can be opened to allow access to the engine 26 and the belt transmission system when this is required, for example, for inspection or maintenance of the engine 26 and/or the transmission system. A windshield 69 connected to the fairings 66 acts as a wind screen to lessen the force of the air on the rider while the snowmobile 10 is moving.

Two skis 70 positioned at the forward end 12 of the snowmobile 10 are attached to the front suspension module 22 of the frame 16 through a front suspension assembly 72. The front suspension module 22 is connected to the front end of the engine support structure 24. The front suspension assembly 72 includes ski legs 74, supporting arms 76 and ball joints (not shown) for operatively connecting to the respective ski leg 74, supporting arms 76 and a steering column 82.

A steering assembly 80, including the steering column 82 and a handlebar 84, is provided generally forward of the seat 60. The steering column 82 is rotatably connected to the frame 16 via the steering bracket 120 (FIG. 2). The lower end of the steering column 82 is connected to the ski legs 74 via a steering rod (not shown). The handlebar 84 is attached to the upper end of the steering column 82. The handlebar 84 is positioned in front of the seat 60. The handlebar 84 is used to rotate the steering column 82, and thereby the skis 70, in order to steer the vehicle 10. A throttle operator (not shown) in the form of a finger-actuated throttle lever is mounted to the right side of the handlebar 84. Other types of throttle operators, such as a thumb-actuated throttle lever and a twist grip, are also contemplated. A brake actuator (not indicated), in the form of a hand brake lever, is provided on the left side of the handlebar 84 for braking the snowmobile 10 in a known manner The windshield 69 may be connected directly to the handlebar 84.

A fuel tank filler opening covered by a cap 92 is disposed on the upper surface of the fuel tank 28 behind the seat 60. It is contemplated that the fuel tank filler opening 92 could be disposed elsewhere on the fuel tank 28.

At the rear end of the snowmobile 10, a snow flap 94 extends downward from the rear end of the tunnel 18. The snow flap 94 protects against dirt that can be projected upward from the drive track 30 when the snowmobile 10 is being driven. It is contemplated that the snow flap 94 could be omitted.

The snowmobile 10 includes other components such as a display cluster, an exhaust system, an air intake system, and the like. As it is believed that these components would be readily recognized by one of ordinary skill in the art, further explanation and description of these components will not be provided herein.

The seat 60 will be described in more detail with reference to FIGS. 2 to 6D.

The seat 60 includes a seat front portion 110 and a seat back portion 130. The front end of the front portion 110 is pivotably connected to the upper structure 24 of the vehicle frame 16. The seat 60 is pivotable with respect to the vehicle frame 16 about a front pivot point 111. The rear end of the seat front portion 110 is rigidly connected to the seat back portion 130. The seat back 130 is pivotably connected to the tunnel 18 via a rear left leg 160 and a rear right leg 170. The seat 60 and the rear left and right legs 160, 180 together form a seat assembly.

The seat front portion 110 includes a front left brace 112 and a front right brace 112 disposed laterally between the upper structure braces 25. The braces 112 extend longitudinally above the tunnel 18. The braces 112 have a tubular structure but it is contemplated that they could not be tubular. For example, the braces 112 could be solid and rectangular in cross section. The forward portion of the left brace 112 extends upwardly, forwardly and rightwardly. The forward portion of the right brace 112 extends upwardly, forwardly and leftwardly. The front ends of the braces 112 are connected together by a bracket 114 which is pivotably connected to the upper structure braces 25 by a ball joint 116. The center of the ball joint 116 defines the front pivot point 111 of the front frame 110.

The ball joint 116 is a rod-end bearing 116. A threaded shaft connected to the casing of the rod-end bearing 116 is inserted into a threaded aperture of the bracket 114. A horizontal bar 118 is inserted through the opening of the ball of the rod-end bearing 116. The horizontal bar 118 extends between the upper structure braces 25. The left end of the bar 118 is connected to the left upper structure brace 25 and the right end of the bar 118 is connected to the right upper structure brace 25.

Figure 3:
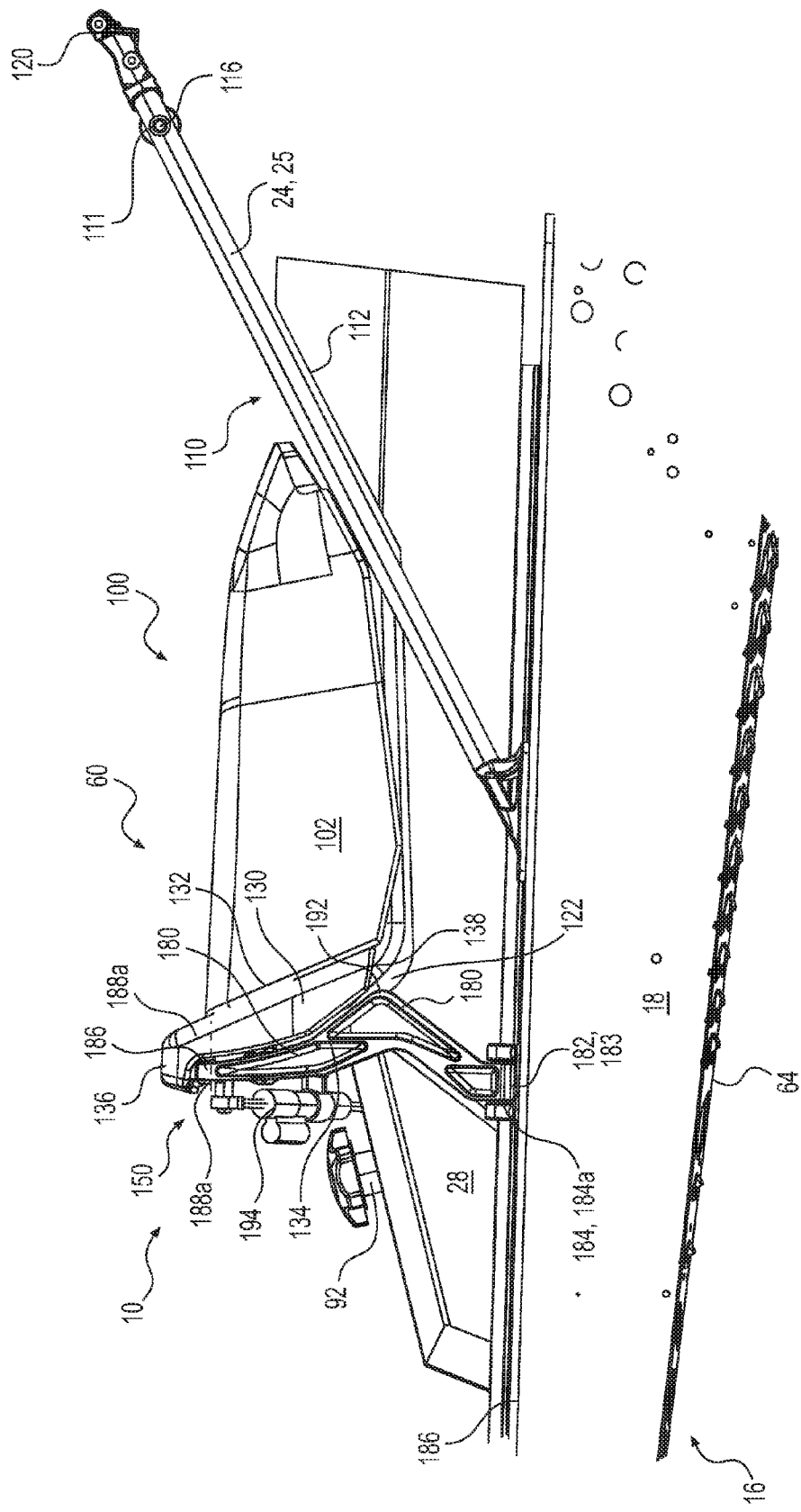
FIG. 3 is a right side elevation view of the snowmobile portion of FIG. 2.

With reference to FIGS. 2 and 3, the fuel tank filler opening with cap 92 is positioned behind the seat 60 so as not to interfere with the braces 112 when the seat 60 pivots with respect to the tunnel 18.

The rearward portions of the braces 112 extend parallel to each other and generally horizontally. The rear end 122 of each brace 112 extends below the seat back portion 130 and curves upwards to be attached to a rear surface 134 of the middle portion 130. The rear end 122 is welded to the rear surface 134 but it is contemplated that the rear end 122 could be rigidly attached to the middle portion 130 by other means. It is contemplated that the rear ends 122 could be attached elsewhere to the seat back portion 130 than as shown herein. For example, the rear ends 122 could be attached to the front surface 132. It is contemplated that the front portion 110 could be detachably attached to the seat back portion 130. It is also contemplated that the front portion 110 could be formed as a single member instead of the left brace 112 and the right brace 112.

The seat cushion 102 is rigidly connected to the upper surface of the parallel horizontally disposed portion of the braces 112. The seat cushion 102 is detachably connected to the braces 112 allowing its replacement when worn out or damaged. The upwardly extending portion of the braces 112 extends forward of the seat cushion 102 and extends higher than the seat cushion 102.

The seat back portion 130 extends laterally and vertically. The seat back portion 130 has a front surface 132 and a rear surface 134. The rear surface of the seat cushion 102 abuts the front surface 132 of seat back 130. The top edge 136 of the seat back 130 extends above the seat cushion 102. The top edge 136 of the seat back portion 130 extends generally horizontally but it is contemplated that the top edge 136 could be curved. It is contemplated that the top edge could extend higher or lower than as shown. The seat back portion 130 is disposed above the tunnel 18 and the rear ends 122 of the left and right braces 112. The bottom edge 138 of the seat back 130 is wider in the lateral direction than the top edge 136. The bottom edge 138 is arched with the central portion between the rear ends 122 of the braces 112 being disposed higher than the portions laterally outward of the braces 112.

It is contemplated that the seat back portion 130 could be formed integrally with the front portion 110. In the illustrated implementation, the seat cushion 102 is removably attached to the front portion 110 and the seat back portion 130. It is contemplated that the seat cushion 102 could be integrally formed with the seat front portion 110 and/or the seat back portion 130.

The rear legs 160, 180 are disposed rearward of the seat back portion 130. The rear legs 160, 180 extend upwards from the upper surfaces 18b of the tunnel 18.

Figure 6A:
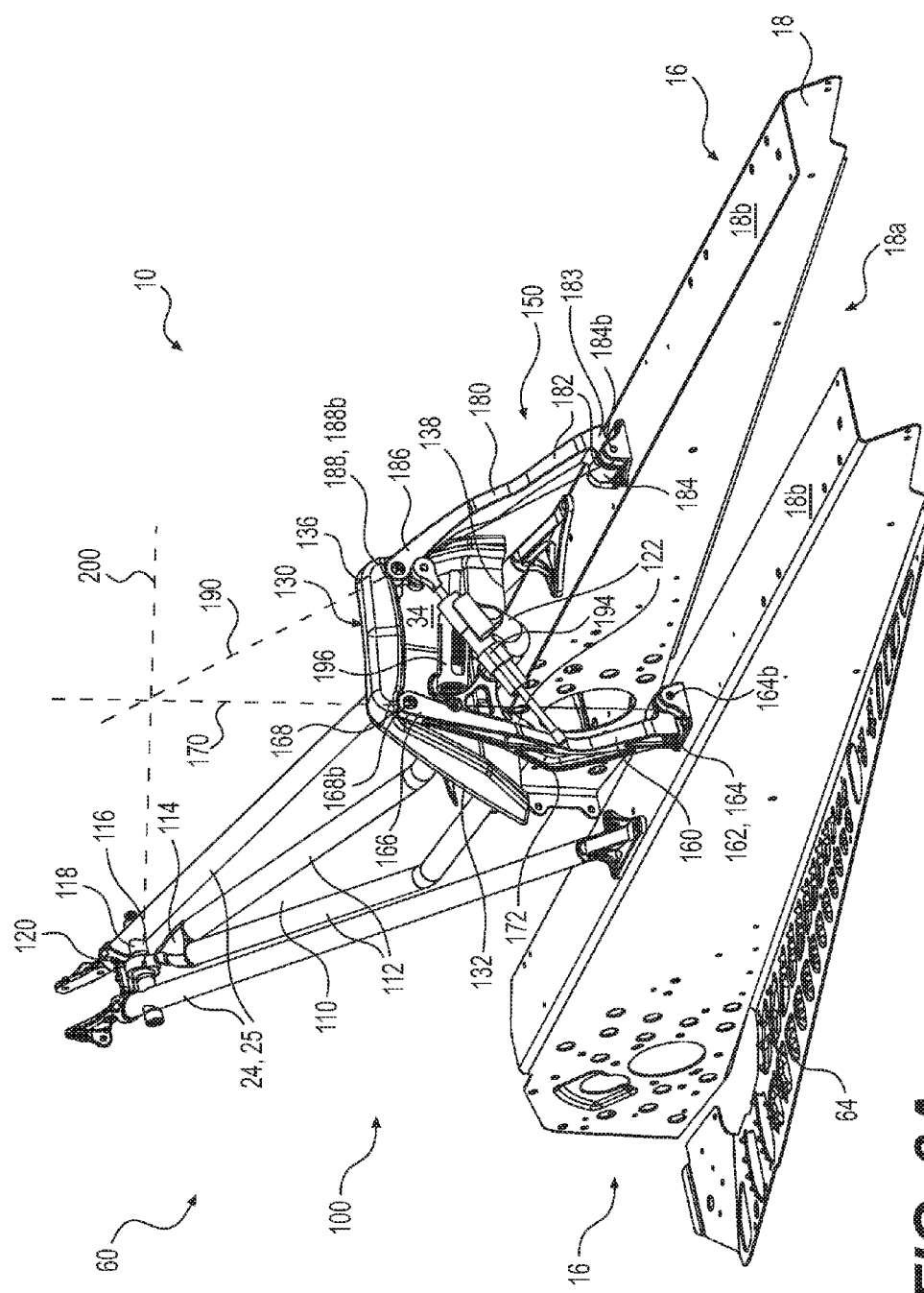
FIG. 6A is a perspective view, taken from a rear, left side, of the snowmobile portion of FIG. 4A with the seat in a configuration tilted toward the right side.

A lower end 162 of the left leg 160 is pivotally connected to the left upper surface 18b of the tunnel 18 by a bracket 164. The horizontal lower end 162 of the left leg 160 extends laterally inwards with the bracket 164 being formed at its inner (right) end. The bracket 164 comprises a tubular portion disposed coaxially between tubular projections of the tunnel upper surface 18b to form a hinged connection therewith. The tubular portion of the bracket 164 extends longitudinally. The left leg 160 is pivotable with respect to the tunnel 18 about a longitudinal lower left pivot axis 164a (FIG. 2) passing through a pivot point 164b defined by the bracket 164. The pivot axis 164a is defined by the cylindrical axis of the tubular portion of the bracket 164. The pivot point 164b is at the longitudinal center of the bracket 164. The laterally outward portion of the lower end 162 acts as a stopper 163 limiting counterclockwise rotation (viewed from the rear) of the left leg 160. As best seen in FIG. 6A, the left leg 160 pivots in the counterclockwise or leftward direction (as viewed from the rear) until the stopper 183 is blocked by the tunnel upper surface 18b, limiting further counterclockwise rotation of the left leg 160 about the axis 164a. In the absence of the stopper 163 disposed laterally outwardly of the bracket 164, the right leg 164 would pivot further in the counter-clockwise direction about the pivot axis 164a. It is contemplated that the left leg 160 could extend directly upwards from the bracket 164 and a pivoting limiter/stopper 163 could be provided on the tunnel upper surface 18b laterally outwardly of the bracket 164.

An upper end 166 of the left leg 160 is pivotally connected to the rear surface 134 of the middle frame 130 just below the top edge 136 by a bolt 168. The left leg 160 is pivotable about a longitudinal upper left pivot axis 168a (FIG. 2) passing through an upper left pivot point 168b defined by the bolt 168 and the longitudinal center of the upper end 166. The lower left pivot point 164b and the upper left pivot point 168b define a rear left axis 170 passing therethrough. The left leg 160 extends upwardly and forwardly from the lower end 162, and upwardly and rearwardly to the upper end 166. A central portion 172 of the left leg 160 is disposed forward of the upper and lower ends 166, 162 and just rearward of the bottom edge 138 of the middle frame 130.

Figure 5A:
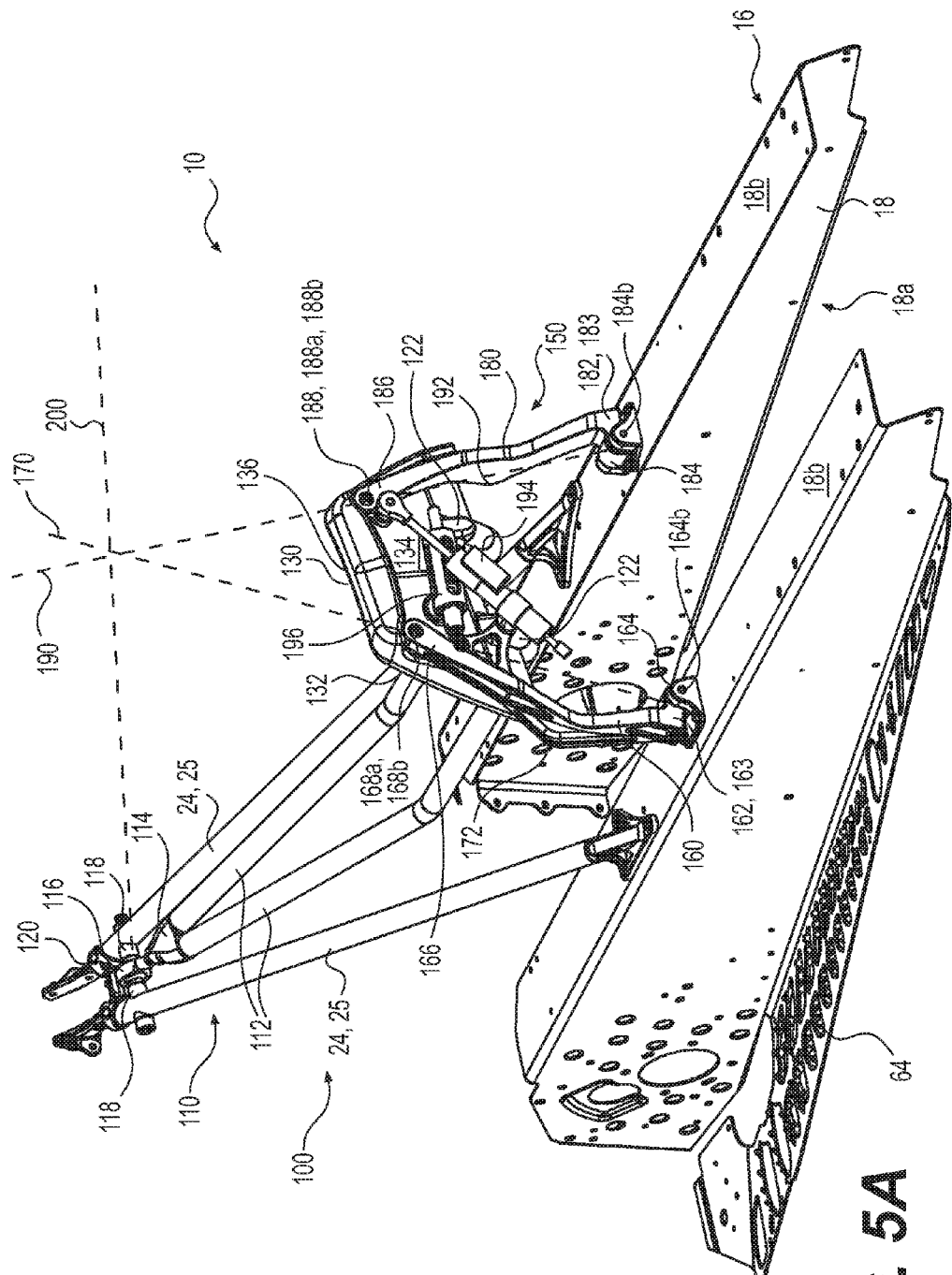
FIG. 5A is a perspective view, taken from a rear, left side, of the snowmobile portion of FIG. 4A with the seat in a configuration tilted toward the left side.

A lower end 182 of the right leg 180 is pivotally connected to the right upper surface 18b of the tunnel 18 by a bracket 184. The horizontal lower end 182 extends laterally inwardly with the bracket 184 being formed at its inner (left) end. The bracket 184 includes a tubular portion disposed coaxially between tubular projections of the tunnel upper surface 18b. The tubular portion of the bracket 184 extends longitudinally. The right leg 180 is pivotable about a longitudinal rear lower right pivot axis 184a (FIG. 2) passing through a lower right pivot point 184b defined by the bracket 184. The pivot axis 184a is defined by the cylindrical axis of the tubular portion of the bracket 184. The pivot point 184b is at the longitudinal center of the bracket 184. The laterally outward portion of the lower end 182 forms a stopper 183 limiting clockwise rotation of the right leg 180. As best seen in FIG. 5A, the right leg 180 pivots in the clockwise or rightward direction (as viewed from the rear) until the stopper 183 is blocked by the tunnel upper surface 18b, limiting further clockwise rotation of the right leg 180 about the axis 184a. In the absence of the stopper 183 disposed laterally outwardly of the bracket 184, the right leg 184 would pivot further in the clockwise direction about the pivot axis 184a. It is contemplated that the right leg 180 could extend directly upwards from the bracket 184 and a pivoting limiter/stopper 183 could be provided on the tunnel upper surface 18b laterally outwardly of the bracket 184.

An upper end 186 of the right leg 180 is pivotally connected to the rear surface 134 of the middle frame 130 just below the top edge 136 by a bolt 188. The right leg 180 is pivotable about a longitudinal upper right pivot axis 188a passing through an upper right pivot point 188b defined by bolt 188 and the longitudinal center of the upper end 186. The upper and lower right pivot points 184b, 188b define a rear right axis 190 passing therethrough. The right leg 180 extends upwardly and forwardly from the lower end 182, and upwardly and rearwardly to the upper end 186. A central portion 192 of the right leg 180 is disposed forward of the upper and lower ends 186, 182 and just rearward of the bottom edge 138 of the middle frame 130.

Figure 4A:
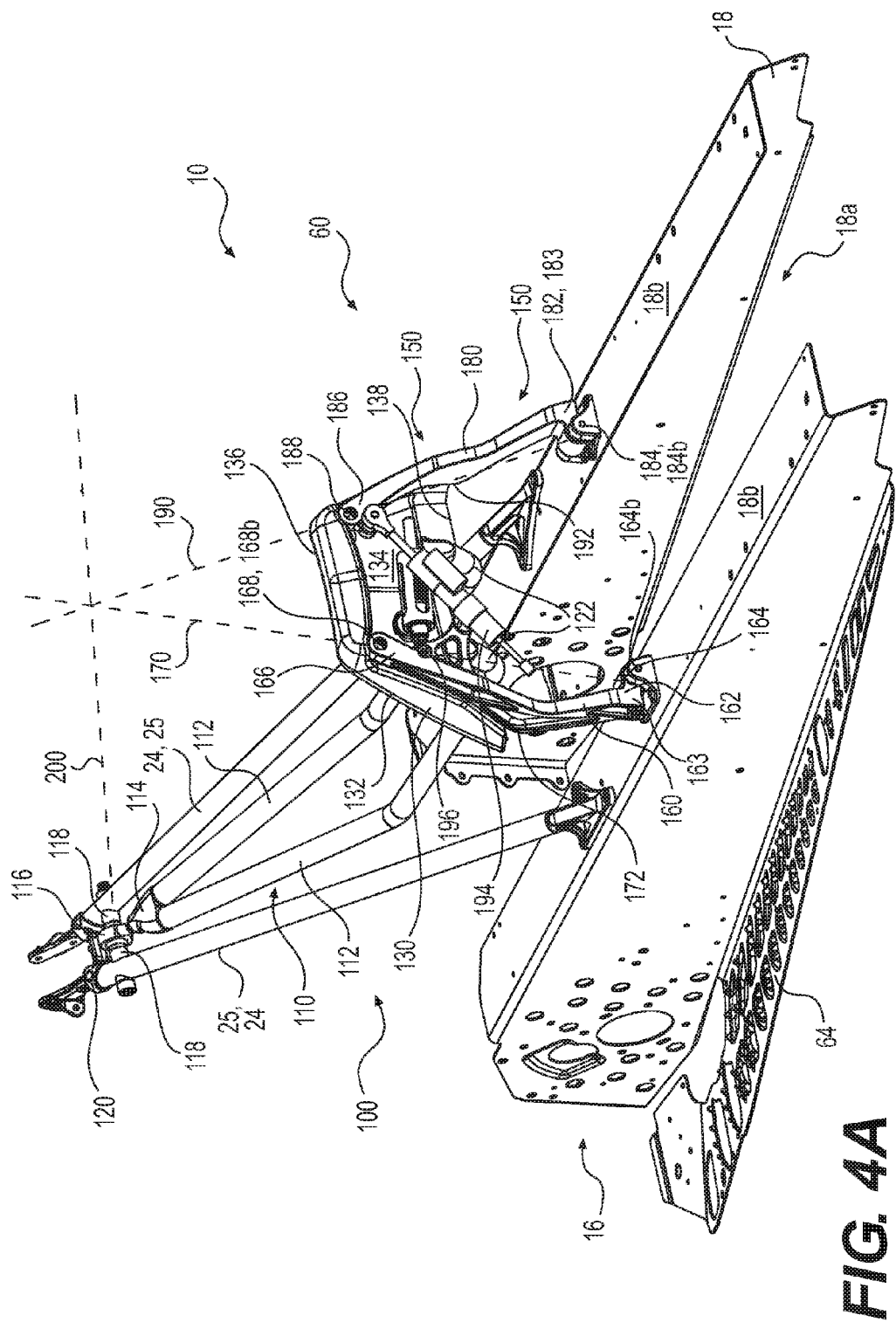
FIG. 4A is a perspective view, taken from a rear, left side, of the snowmobile portion of FIG. 2 with the seat cushion of the seat and the fuel tank removed for clarity and with the seat in an untilted configuration.
Figure 4B:
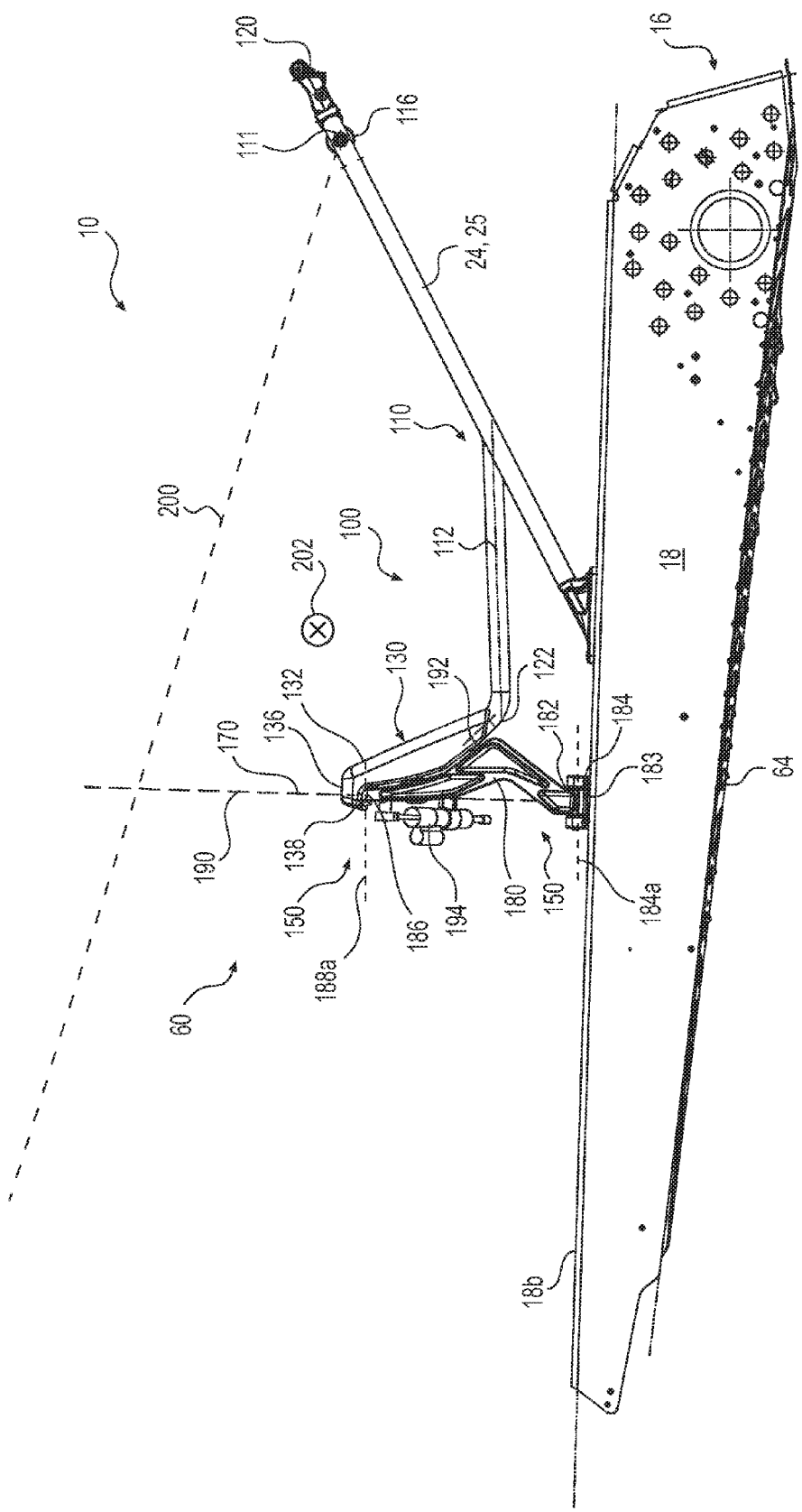
FIG. 4B is a right side elevation view of the snowmobile portion of FIG. 4A.
Figure 4C:
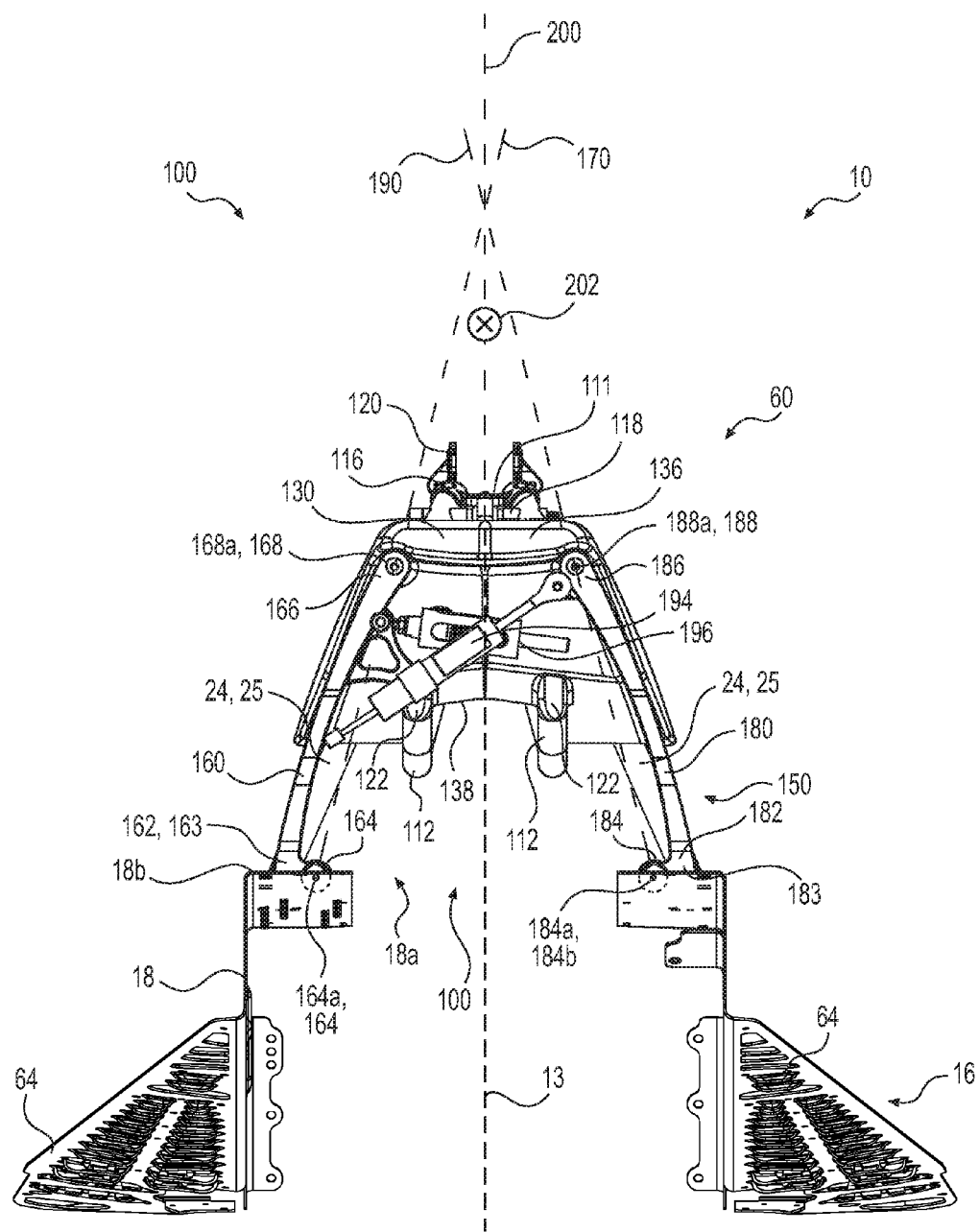
FIG. 4C is a rear elevation view of the snowmobile portion of FIG. 4A.
Figure 5B:
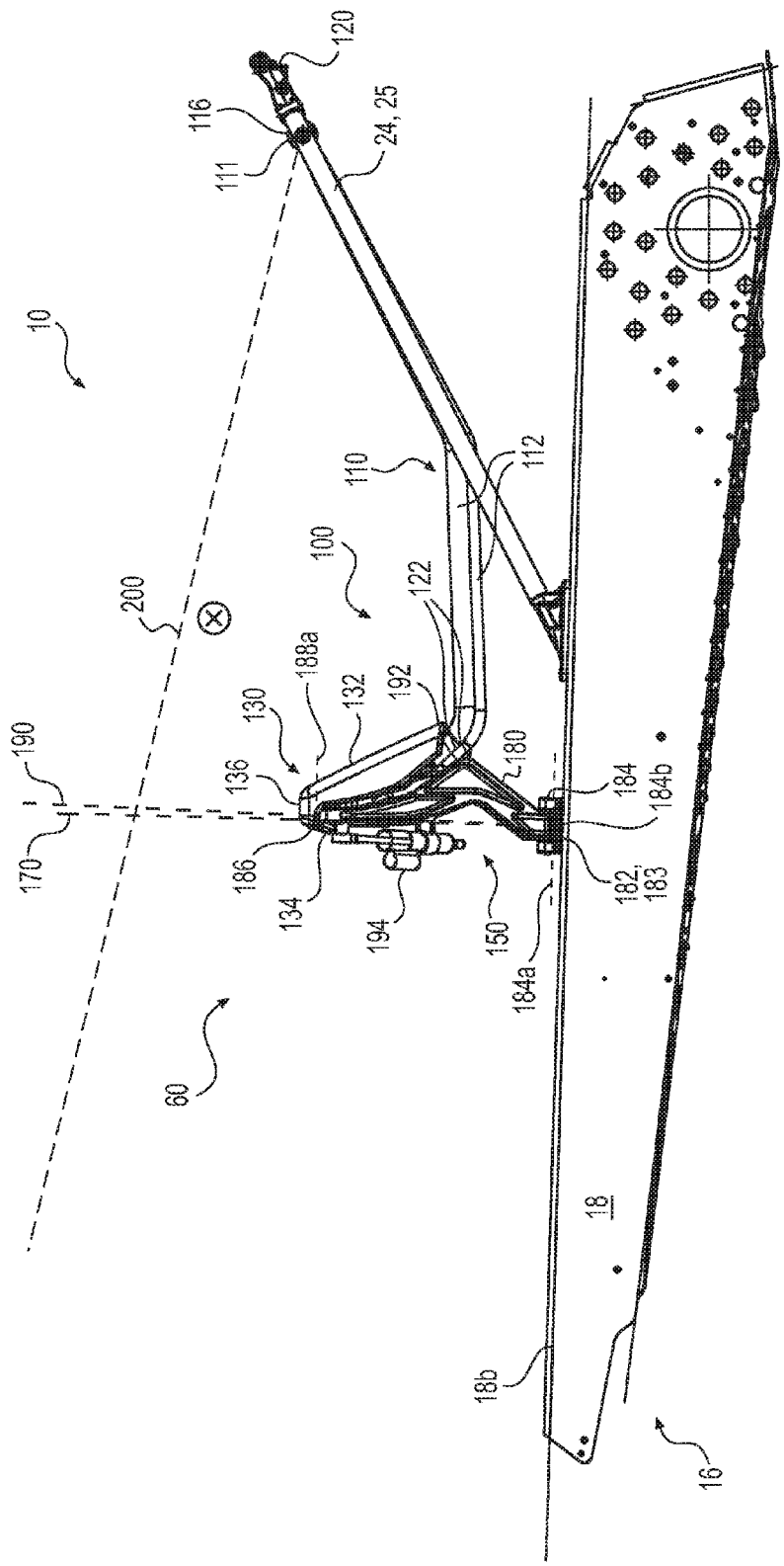
FIG. 5B is a right side elevation view of the snowmobile portion of FIG. 5A.
Figure 5C:
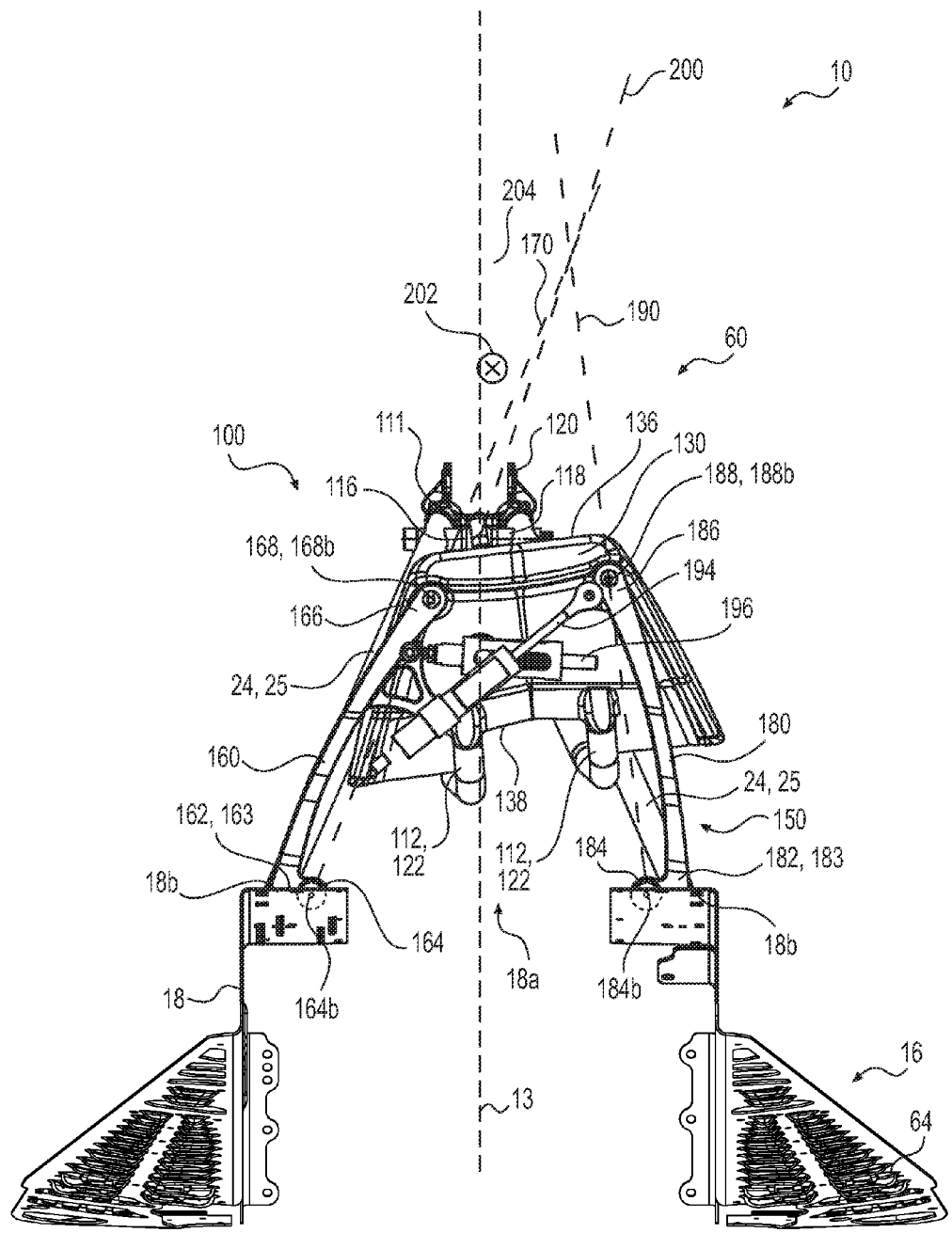
FIG. 5C is a rear elevation view of the snowmobile portion of FIG. 5A.
Figure 6B:
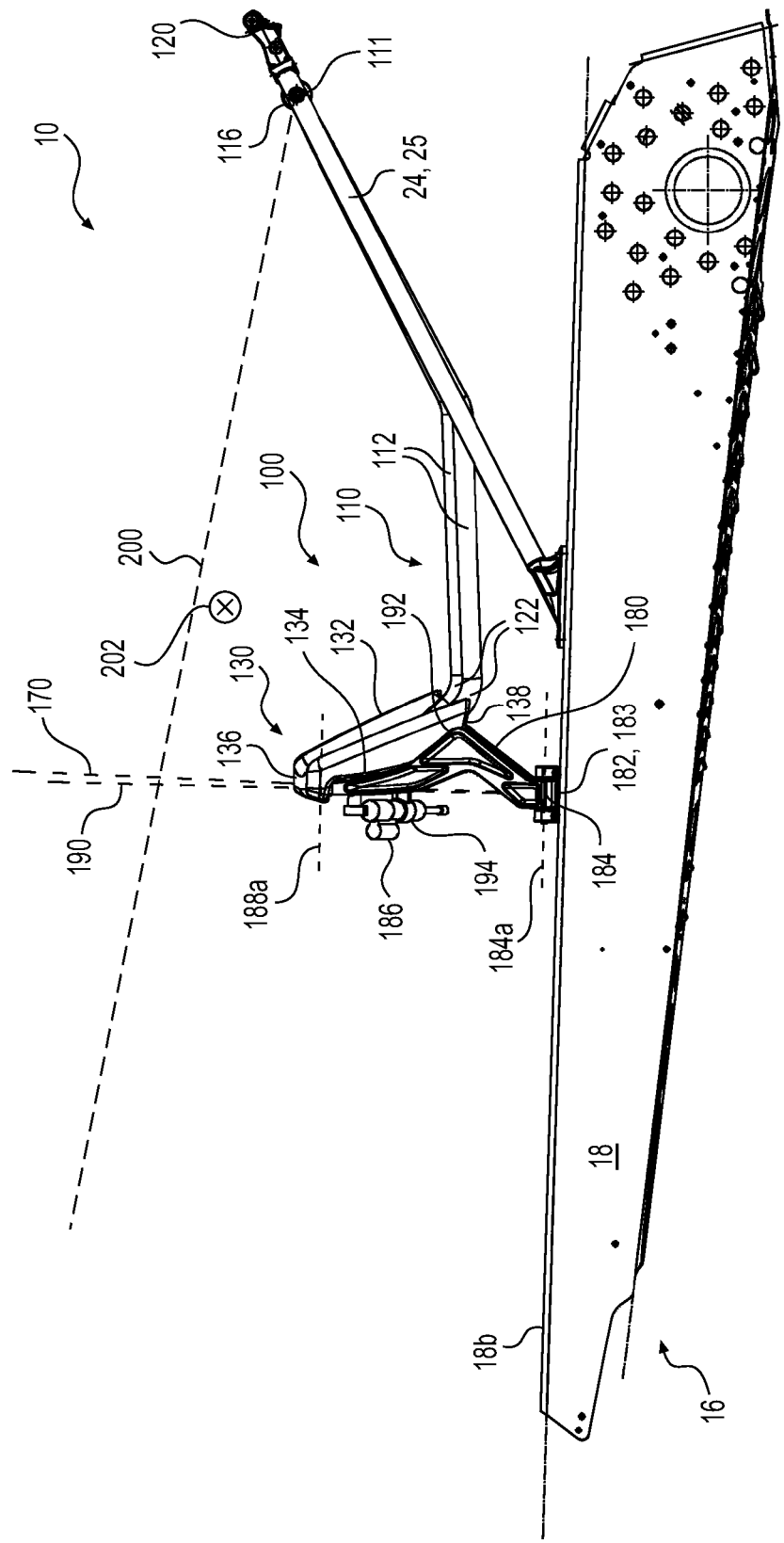
FIG. 6B is a right side elevation view of the snowmobile portion of FIG. 6A.
Figure 6C:
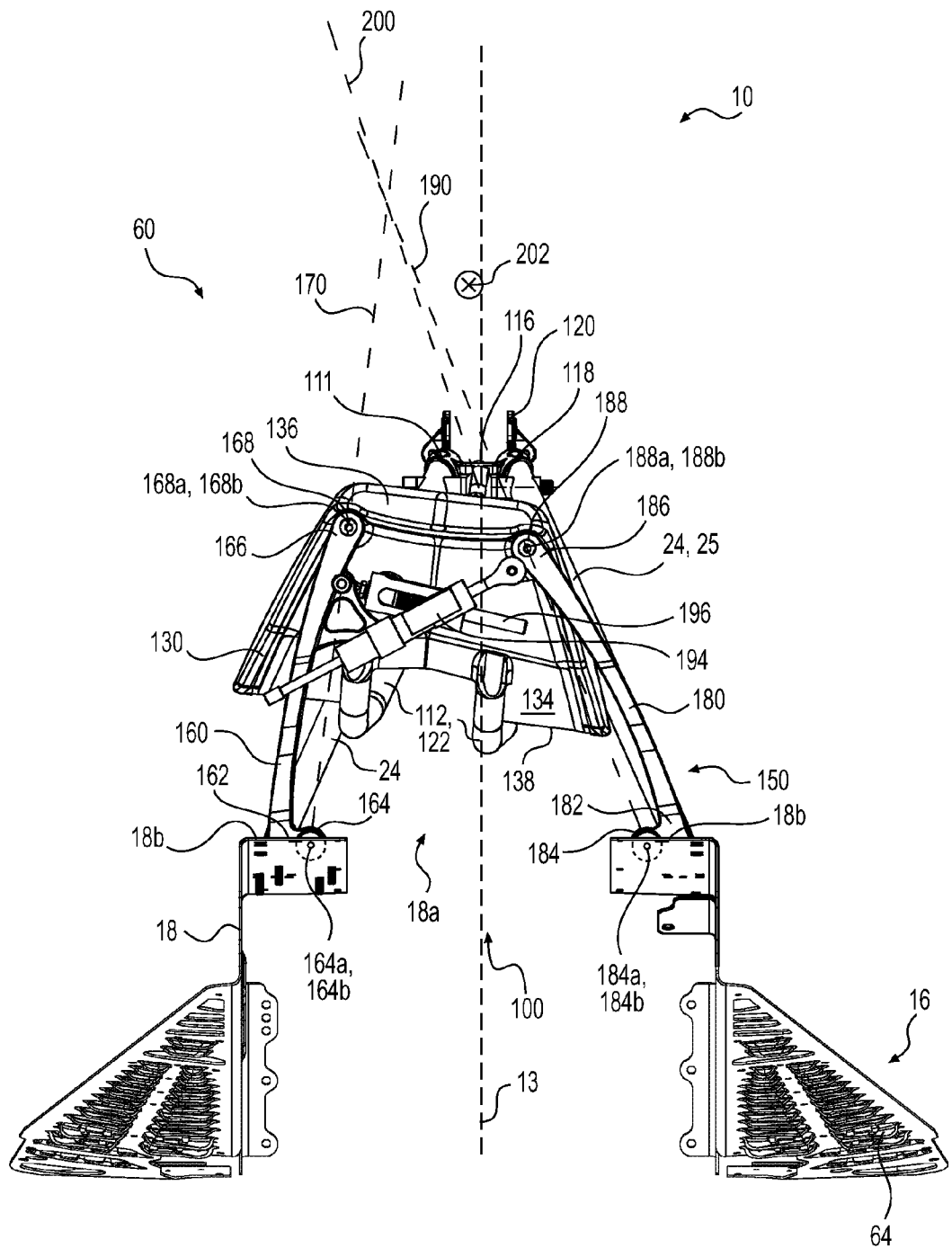
FIG. 6C is a rear elevation view of the snowmobile portion of FIG. 6A.

With reference to FIGS. 4C, 5C and 6C, the left leg 160, the seat back or the middle frame 130, the right leg 180, and tunnel 18 form a double rocker type four-bar linkage 150. The upper ends 166, 186 of the left and right legs 160, 180 are closer to each other than the lower ends 162, 182. Thus, when viewed from the rear, the legs 160, 180 extend upwardly and laterally inwardly from the tunnel 18. The rear left axis 170 and the rear right axis 190 are non-parallel. The rear left axis 170 and the rear right axis 190 intersect in the lateral and vertical directions at a point above the legs 160, 180 and the seat back 130 when the seat 60 is in an untilted position. In the illustrated implementation, the intersection of the axes 170, 190 is located above the legs 160, 180 and the seat back 130 even in the tilted positions (FIGS. 5C and 6C) but it is contemplated that the intersection of the axes 170, 180 could be laterally outwardly of the seat back 130 and legs 160, 180 in some tilted positions.

The seat 60 is pivotable about an instantaneous seat pivot axis 200 formed by a line passing through the front pivot point 111, the left axis 170 and the right axis 190. The pivot axis 200 is called instantaneous since it is constantly moving with the movement of the seat 60. As the instantaneous axis 200 remains above the center of gravity of the driver at all times, the seat 60 pivots towards the outside of the turn such that the driver seated thereon tilts to the inside of the turn.

The seat 60, pivotably connected to the tunnel 18 by the four-bar linkage 150, moves in an arc centered about the intersection point of the left and right axes 170, 190 when viewed from the rear. Additionally, the seat 60 which is also pivotally connected about the front pivot 111 to the snowmobile frame 16 also moves in an arc centered about the front pivot point 111 when viewed from above. The pivotal motion of the seat 60 is described below with respect to FIGS. 4A to 6D.

A damper 194 is connected between the rear legs 160, 180 to provide stability against undesirable pivoting of the seat 60, for example, while driving in a straight ahead direction on uneven terrain. The damper 194 is a linear hydraulic damper. The snowmobile 10 often makes subtle left and right movements due to variations of the terrain. It would be desirable in such circumstances to prevent pivoting of the seat 60 in response to small movements of the driver when travelling on slightly uneven terrain. It is contemplated that the damper 194 could be connected between any two moving parts of the pivotable seat 60, for example, the damper 194 could be connected between the right leg 180 and the middle frame 130.

A spring 196 connected between the seat back 130 and the left leg 160 biases the seat 60 toward the untilted or upright configuration (FIG. 4C). The spring 196 is a tunable spring. The compression of the spring 196 can be adjusted to achieve the desired pivoting range for the seat 60 or the response time for the seat 60 to return from a tilted configuration (FIGS. 5A to 6D) to an upright configuration. It may be desired to adjust the pivoting range and response time based on the factors such as centrifugal force, vehicle weight, driver, weight, the driver's preferences, type of vehicle, terrain and the like. Thus, the pivoting of the seat 60 in the illustrated implementation of the snowmobile 10 is controlled rather than free.

It is contemplated that a seat assembly could be provided for a vehicle 10. The seat assembly would include the rear left and right legs 160, 180 and the seat front and back portions 110, 130. The seat assembly could additionally include the seat cushion 102.

Figure 4D:
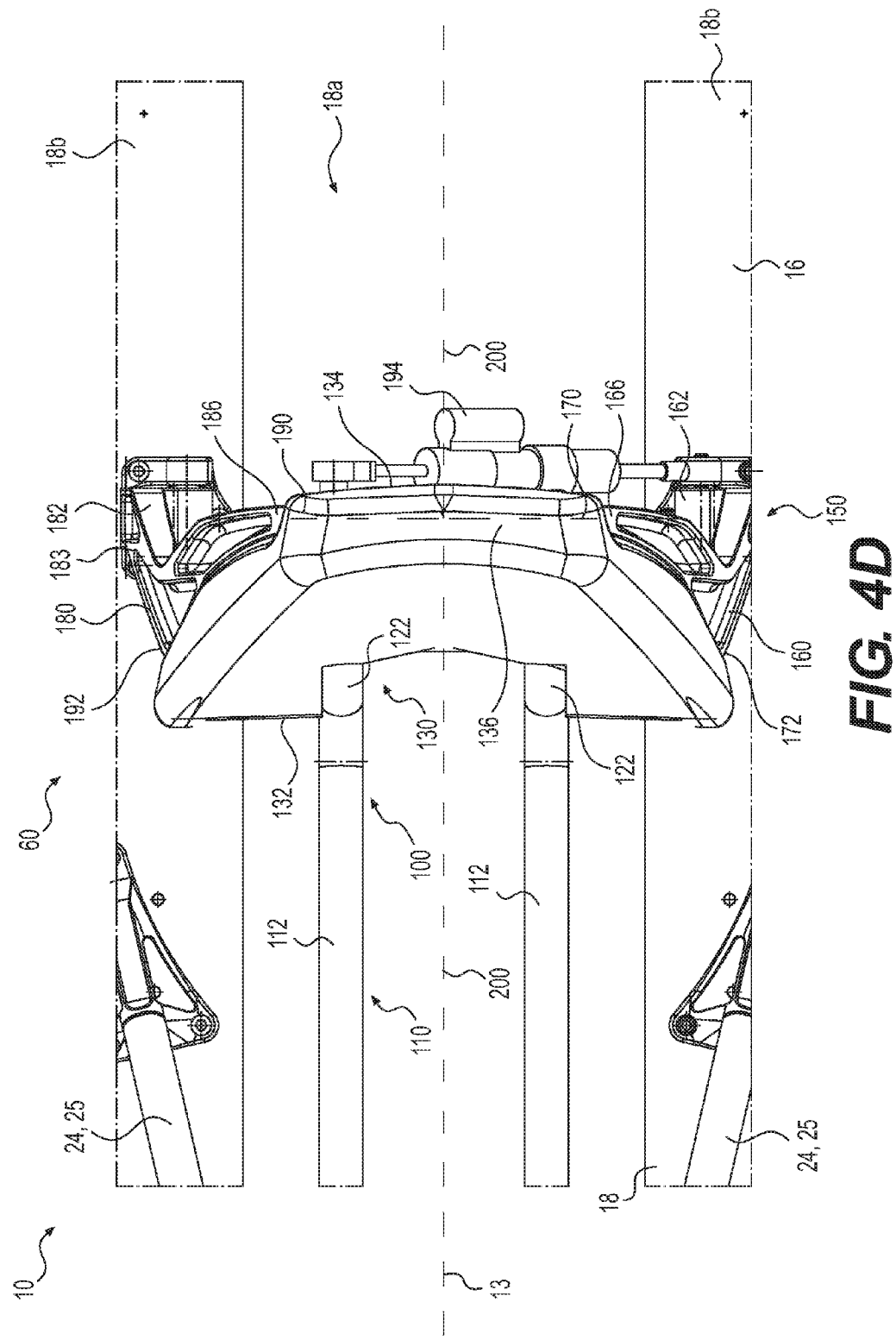
FIG. 4D is a close-up top plan view of a rear portion of the seat of FIG. 4A.

With reference to FIGS. 4A to 4D, when the snowmobile 10 is moving in a straight ahead direction, the seat 60 is in an untilted configuration (driver is in an upright position). As best seen in FIG. 4B, the left and right braces 112 are aligned with each other in the vertical direction. The left upper pivot point 168b is longitudinally aligned with the right upper pivot point 188b. As best seen in FIGS. 4C and 4D, the left and right braces 112 are respectively disposed on the left and right side of the longitudinal centerplane 13 and equidistant therefrom. The rear left and right legs 160, 180 are respectively disposed on the left and right side of the longitudinal centerplane 13 and equidistant therefrom. The left upper pivot point 168b is vertically aligned with the right upper pivot point 188b. The left and right axes 170, 190 are aligned in the longitudinal direction (FIG. 4B) and intersect at a point aligned with the longitudinal centerplane 13 (FIGS. 4C and 4D). Thus, the seat pivot axis 200 lies in the longitudinal centerplane 13. As can be seen in FIG. 3, the laterally centered portion of the seat cushion 102 faces upwardly perpendicular to the longitudinal centerplane 13. The laterally centered portion of the front surface 132 of the seat back 130 faces forwardly perpendicular to the longitudinal centerplane 13.

Figure 5D:
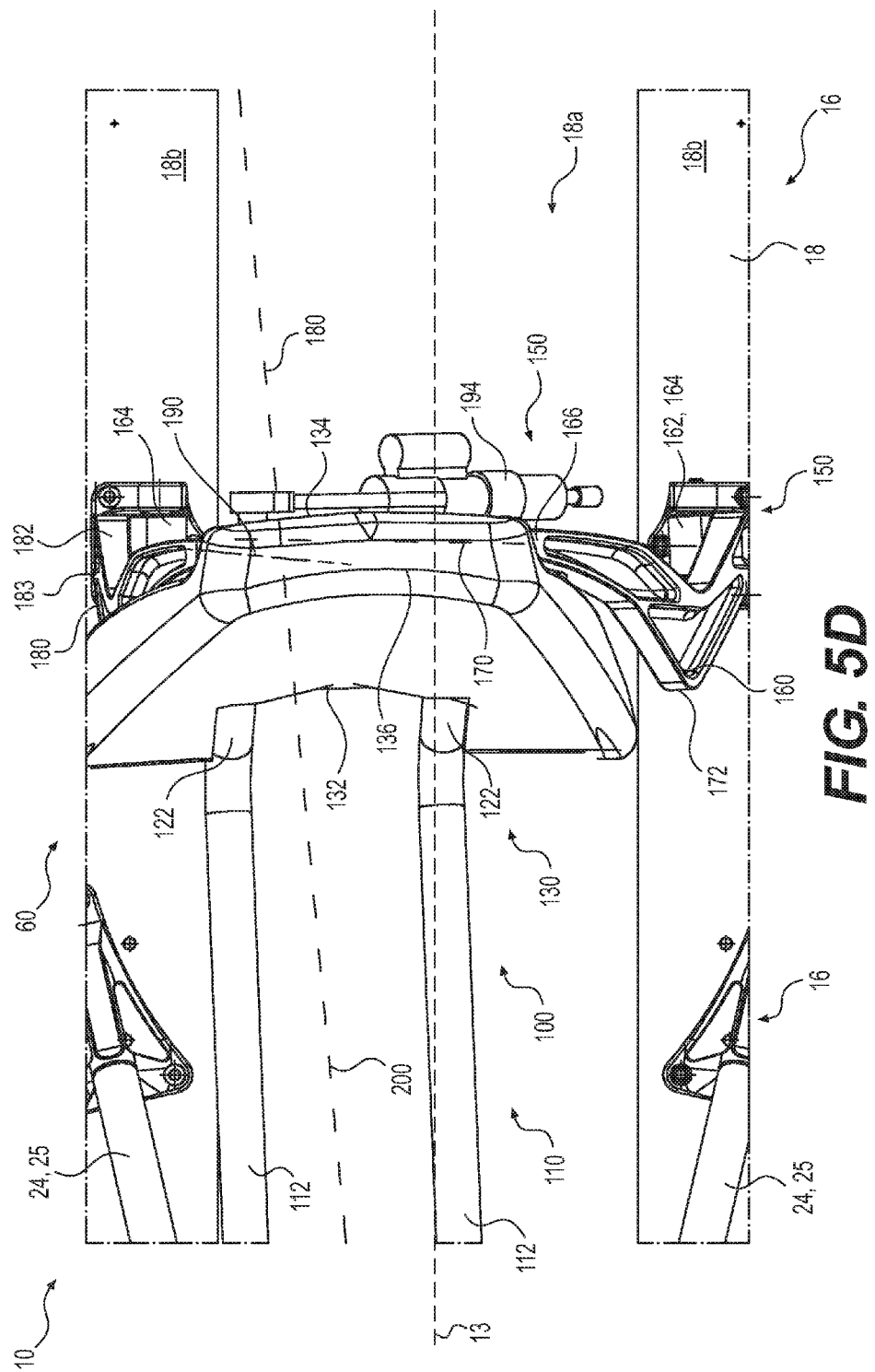
FIG. 5D close-up top plan view of the rear portion of the seat of FIG. 5A.

With reference to FIGS. 5A to 5D, when the snowmobile 10 is turning towards the left, the seat 60 is in a left tilt configuration (seat is pivoted towards the right side, driver leans towards the left side). The left and right legs 160, 180 pivot towards the right side with respect to the tunnel 18. The upper ends 166 and 186 of the rear legs 160, 180 are displaced rightwardly compared to their positions in the untilted configuration of the seat 60. As best seen in FIGS. 5C and 5D, the rear left and the rear right pivot axes 170, 190 intersect in the lateral and vertical directions at a point disposed rightwardly of the longitudinal centerplane 13. The right upper pivot point 188b is disposed slightly higher than the left upper pivot point 168b as can be best seen in FIG. 5C. The right side of the top edge 136 of the seat back 130 is higher than the left side of the top edge 138 of the seat back 130. The seat braces 112 move rightwardly from their upright or untilted position as can be seen best in FIGS. 5A, 5C and 5D. The right brace 112 is thus closer to the right upper structure brace 25 than the left brace 112 is to the left upper structure brace 25. The right brace 112 is also disposed higher than the left brace 112 as can be seen in FIG. 5B. Thus, the seat cushion 102, rigidly attached to the upper surface of the braces 112 inclines such that the laterally centered portion of the seat surface is inclined at a non-perpendicular angle to the longitudinal centerplane 13 and facing towards the left side (inside of the turn). The driver can thus remain seated in the laterally centered portion of the seat 60 while leaning toward the left side with respect to the snowmobile 10 (i.e. with respect to the longitudinal centerplane 13). The driver's center of gravity 202 (shown schematically in FIGS. 5B and 5C), located slightly above the driver's pelvis, is disposed rightwardly of the longitudinal centerplane 13. The gravitational force thus exerts a counterclockwise moment about the driver's pelvis thereby helping to reduce the centrifugal force sensed by the driver. The center of gravity 202 is located below the instantaneous pivot axis 200 which helps to bring the driver back to the center.

As mentioned above, the seat 60 also pivots about the front pivot point 111 as can be seen in FIGS. 5B and 5D. The rear end 122 of the right brace 112 moves longitudinally forwardly of the rear end 112 of the left brace 112. The right side of the seat back portion 130 is also pulled forward from the rear leg 180 as can be seen by comparing FIGS. 4B and 5B. The bolt 188 pivotably fastens the upper end 166 of the rear left leg 160 to the seat back portion 130 so as to allow a small amount of longitudinal motion therebetween. The upper end 186 of the right leg 180 is also pulled forward such that the right upper pivot point 188b moves longitudinally forwardly of the left upper pivot point 168b. The right axis 190 tilts forwardly and upwardly compared to the left axis 170.

Figure 6D:
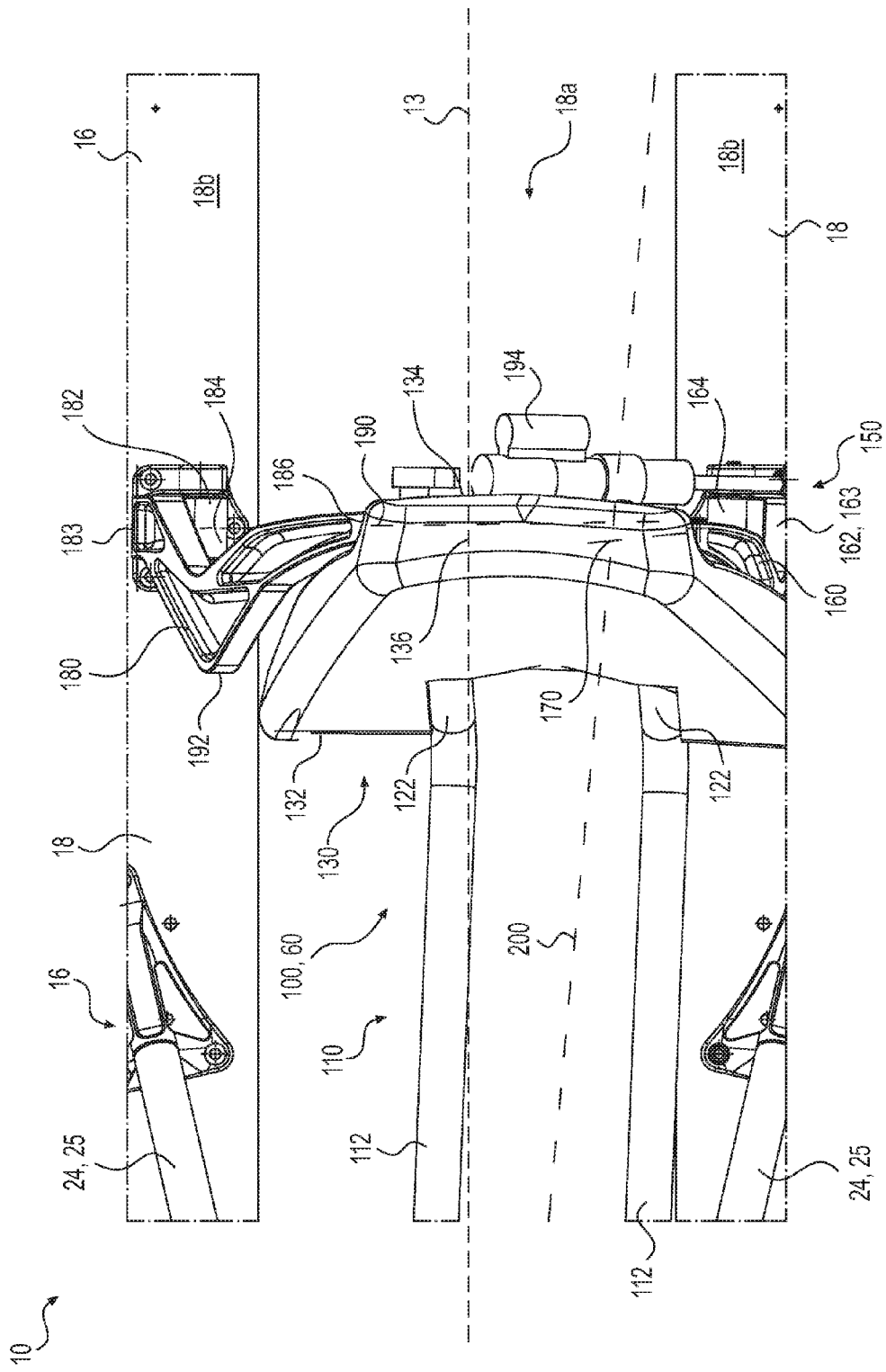
FIG. 6D is close-up top plan view of the rear portion of the seat of FIG. 6A.

Similarly, With reference to FIGS. 6A to 6D, when the snowmobile 10 is turning towards the right, the seat 60 is in a right tilt configuration (seat is pivoted towards the left side, driver leans towards the right side). The left and right legs 160, 180 pivot towards the left side with respect to the tunnel 18. The upper ends 166 and 186 of the rear legs 160, 180 are displaced leftwardly compared to their positions in the untilted configuration of the seat 60. As best seen in FIGS. 6C and 6D, the rear left and the rear right pivot axes 170, 190 intersect in the lateral and vertical directions at a point disposed leftwardly of the longitudinal centerplane 13. The left upper pivot point 168b is disposed slightly higher than the right upper pivot point 188b as can be best seen in FIG. 6C. The left side of the top edge 136 of the seat back portion 130 is higher than the right side of the top edge 138. The seat braces 112 move leftwardly from their upright or untilted position as can be seen best in FIGS. 6A, 6C and 6D. The left brace 112 is thus closer to the left upper structure brace 25 than the right brace 112 is to the right upper structure brace 25. The left brace 112 is also disposed higher than the right brace 112 as can be seen in FIG. 6B. Thus, the seat cushion 102, rigidly attached to the upper surface of the braces 112 inclines such that the laterally centered portion of the seat surface is inclined at a non-perpendicular angle to the longitudinal centerplane 13 and facing towards the right side (inside of the turn). The driver can thus remain seated in the laterally centered portion of the seat 60 while leaning toward the right side with respect to the snowmobile 10 (i.e. with respect to the longitudinal centerplane 13). The driver's center of gravity 202 (shown schematically in FIGS. 6B and 6C), located slightly above the driver's pelvis, is disposed leftwardly of the longitudinal centerplane 13. The gravitational force thus exerts a clockwise moment about the driver's pelvis thereby helping to reduce the centrifugal force sensed by the driver. The center of gravity 202 is located below the instantaneous pivot axis 200 which helps to bring the driver back to the center.

The seat 60 also pivots about the front pivot point 111 as can be seen in FIGS. 6B and 6D. The rear end 122 of the left brace 112 moves longitudinally forwardly of the rear end 112 of the right brace 112. The left side of the seat back portion 130 is also pulled forward from the rear leg 160 as can be seen by comparing FIGS. 4B and 6B. The bolt 168 pivotably fastening the upper end 166 of the rear left leg 160 to the seat back portion 130 also allows a small amount of longitudinal motion therebetween. The upper end 166 of the left leg 160 is also pulled forward such that the left upper pivot point 168b moves longitudinally forwardly of the right upper pivot point 188b. The left axis 170 tilts forwardly and upwardly compared to the left axis 190.

The inclination of the seat 60 and the driver seated thereon toward the inside of the turn reduces the effort required on the part of the driver to remain on the vehicle 10 during the turn and to counteracts the roll of the vehicle 10 towards the outside of the turn. The pivoting of the seat 60 causes the driver's center of gravity 202 to be displaced further toward the interior of the turn than the driver's pelvis. Therefore, the driver experiences a moment about the pelvis generated by the gravitational force that is in a direction opposite to the moment about the pelvis generated by the centrifugal force. As the resultant moment experienced by the driver is reduced, the driver applies a smaller force to the seat cushion 102 which reduces the deformation of the seat cushion 102 and provides for a more comfortable ride. The pivoting seat 60 also reduces the amount of leaning needed by the driver to counter the centrifugal force experienced as described above. In a vehicle without a pivoting seat 60, the driver needs to lean further toward the interior of the turn (relative to the seat 60 and longitudinal centerplane 13 of the vehicle 10) in order to counteract the centrifugal force experienced than in a vehicle having the pivotable seat 60 shown herein. As the driver remains in the central portion of the seat 60 which is more cushioned than the side portions, the impact experienced when encountering bumps is better dissipated. In addition, the pivoting seat 60 described above allows the driver to maintain a more vertical posture when travelling along the sides of slopes compared to a driver in a vehicle having a fixed seat. When the vehicle 10 is on the side of a slope, the seat 60 tends to aligns itself with the instantaneous pivot axis 200, and thus to return to a more horizontal level. The pivoting seat 60 also functions as a suspension system for sharp lateral impacts or movements. Thus, the pivoting seat 60 provides more impact absorption when encountering bumps while negotiating turns (due to the sudden variation of lateral acceleration) or when regaining grip after momentarily losing contact with the surface (for example, while passing over an ice patch while negotiating a turn).

Modifications and improvements to the above-described implementations of the present technology may become apparent to those skilled in the art. The foregoing description is intended to be exemplary rather than limiting.

The scope of the present technology is therefore intended to be limited solely by the scope of the appended claims.

What is claimed is:

1. A vehicle comprising:
a vehicle body defining a longitudinal axis of the vehicle;
a pivotable seat having a seat front portion and a seat back portion, the seat front portion being pivotally connected to the vehicle body about a front pivot point and extending rearwardly therefrom to the seat back portion;
a rear left leg being pivotally connected to the vehicle body to pivot about a left lower longitudinal pivot axis passing through a left lower pivot point, the rear left leg being pivotally connected to the seat back portion to pivot about a left upper longitudinal pivot axis passing through a left upper pivot point; and
a rear right leg being pivotally connected to the vehicle body to pivot about a right lower longitudinal pivot axis passing through a right lower pivot point, the rear right leg being pivotally connected to the seat back portion to pivot about a right upper longitudinal pivot axis passing through a right upper pivot point,
a distance between the left and right lower pivot points being greater than a distance between the left and right upper pivot points,
the seat being pivotable relative to the vehicle body about an instantaneous seat pivot axis passing through the front pivot point, a left axis extending through the left upper and lower pivot points, and a right axis extending through the right upper and lower pivot points.

2. The vehicle of claim 1, wherein the rear left leg and the rear right leg form a four-bar linkage with the seat back portion and the vehicle body.

3. The vehicle of claim 1, wherein the seat moves in an arc centered about the front pivot point when viewed from above and when viewed from the rear.

4. The vehicle of claim 1, further comprising a right stopper limiting pivoting of the rear right leg and a left stopper limiting pivoting of the rear left leg.

5. The vehicle of claim 1, wherein the seat comprises a seat frame and a seat cushion, the seat frame comprising a front frame member pivotably connected to the vehicle body about the front pivot point, the seat cushion being connected to the front frame member.

6. The vehicle of claim 1, further comprising a spring connected between one of the seat, the rear left leg and the rear right leg and an other of the seat, the rear left leg and the rear right leg, the spring biasing the seat to an untilted position where the instantaneous seat pivot axis is aligned with a longitudinal centerplane defined by the vehicle body.

7. The vehicle of claim 1, wherein:
the rear left leg extends forwardly and upwardly from the left lower pivot point, and rearwardly and upwardly to the left upper pivot point; and
the rear right leg extends forwardly and upwardly from the right lower pivot point, and rearwardly and upwardly to the right upper pivot point.

8. The vehicle of claim 1, further comprising a ball joint pivotably connecting the seat front portion to the vehicle body.

9. The vehicle of claim 1, wherein the seat front portion extends rearwardly and downwardly from the front pivot point.

10. The vehicle of claim 1, wherein the seat front portion comprises a front left brace and a front right brace connected together at respective front ends thereof.

11. The vehicle of claim 10, wherein a distance between the front right brace and the front left brace increases with distance from the front pivot point.

12. The vehicle of claim 10, wherein at least a portion of the front left brace is parallel to a portion of the front right brace.

13. The vehicle of claim 1, wherein the vehicle is a snowmobile comprising a longitudinally extending tunnel, the rear left leg and the rear right leg being connected to the tunnel and extending upwardly therefrom.

14. The vehicle of claim 13, wherein:
the snowmobile further comprises an upper structure rigidly connected to the tunnel, the seat front portion being pivotably connected to the upper structure about the front pivot point; and
the upper structure comprises a rear left upper structure brace and a rear right upper structure brace extending forwardly and upwardly from the tunnel, the seat front portion is disposed laterally between the left and right upper structure braces.

15. The vehicle of claim 1, wherein when a rider is seated on the seat, a center of gravity of the rider is disposed vertically lower than an intersection point of the left axis with the right axis.

16. The vehicle of claim 1, wherein when a rider is seated on the seat, the instantaneous pivot axis extends upwardly and rearwardly from the front pivot point above a center of gravity of the rider.

17. The vehicle of claim 1, wherein the front pivot point is disposed vertically higher than a bottom surface of the seat.

18. The vehicle of claim 1, wherein the front pivot point is disposed vertically higher than the left upper pivot point and the right upper pivot point.

19. The vehicle of claim 1, wherein, as viewed from behind:
when the seat pivots rightwardly from an untilted position, a laterally centered portion of a top edge of the seat moves rightwardly and upwardly; and
when the seat pivots leftwardly from the untilted position, the laterally centered portion of the top edge of the seat moves leftwardly and upwardly.

20. The vehicle of claim 19, wherein, as viewed from above:
when the seat pivots rightwardly from the untilted position, a laterally centered portion of the top edge of the seat moves rightwardly and forwardly; and
when the seat pivots leftwardly from the untilted position, the laterally centered portion of the top edge of the seat moves leftwardly and forwardly.

* * * * *